(12) United States Patent
Pataut et al.

(10) Patent No.: US 11,674,035 B2
(45) Date of Patent: Jun. 13, 2023

(54) EPOXY-FUNCTIONALIZED NOVOLAK RESIN COMPOSITION

(71) Applicant: COMPAGNIE GENERALE DES ETABLISSEMENTS MICHELIN, Clermont-Ferrand (FR)

(72) Inventors: Gael Pataut, Clermont-Ferrand (FR); Thibault Derouineau, Clermont-Ferrand (FR); Laura Luiz, Cierp-Gaud (FR); David Doisneau, Clermont-Ferrand (FR)

(73) Assignee: COMPAGNIE GENERALE DES ETABLISSEMENTS MICHELIN, Clermont-Ferrand (FR)

( * ) Notice: Subject to any disclaimer, the term of this patent is extended or adjusted under 35 U.S.C. 154(b) by 353 days.

(21) Appl. No.: 16/956,961

(22) PCT Filed: Dec. 7, 2018

(86) PCT No.: PCT/FR2018/053150
§ 371 (c)(1),
(2) Date: Jun. 22, 2020

(87) PCT Pub. No.: WO2019/122575
PCT Pub. Date: Jun. 27, 2019

(65) Prior Publication Data
US 2020/0392328 A1    Dec. 17, 2020

(30) Foreign Application Priority Data
Dec. 22, 2017 (FR) ...................................... 1762991

(51) Int. Cl.
*C08L 63/04* (2006.01)
*B60C 9/00* (2006.01)
(Continued)

(52) U.S. Cl.
CPC .............. *C08L 63/04* (2013.01); *B60C 9/005* (2013.01); *B60C 9/1807* (2013.01); *C08G 59/08* (2013.01);
(Continued)

(58) Field of Classification Search
None
See application file for complete search history.

(56) References Cited

U.S. PATENT DOCUMENTS 5,837,077 A    11/1998  Kabe et al.
8,779,036 B2    7/2014  Spyrou et al.
(Continued)

FOREIGN PATENT DOCUMENTS

CA    1337088       9/1995
EP    0101400 A2    2/1984
(Continued)

OTHER PUBLICATIONS

International Search Report dated Feb. 6, 2019, in corresponding PCT/FR2018/053150 (4 pages).
(Continued)

*Primary Examiner* — Megan McCulley
(74) *Attorney, Agent, or Firm* — Venable LLP (57) ABSTRACT

A composition of epoxide-functionalized resins comprises at least a first epoxide-functionalized novolac resin, a second epoxide-functionalized novolac resin, and a curing agent selected from phenolic or amine-type curing agents, the average molar mass of the group consisting of the entirety of the epoxidized novolac resins in the said composition being between 550 and 650 g/mol, the average epoxide functionality of the said group being between 3 and 3.5 eq epoxide/mol, and the said composition having a glass transition temperature Tg of at least 160° C.

17 Claims, 2 Drawing Sheets (51) Int. Cl.
*B60C 9/18* (2006.01)
*C08G 59/08* (2006.01)
*C08G 59/50* (2006.01)
*C08G 59/62* (2006.01)

(52) U.S. Cl.
CPC .......... *C08G 59/50* (2013.01); *C08G 59/621* (2013.01); *C08L 2205/02* (2013.01)

(56) References Cited

U.S. PATENT DOCUMENTS

| | | |
|---|---|---|
| 10,604,613 B2 | 3/2020 | Doisneau et al. |
| 2017/0362370 A1 | 12/2017 | Doisneau et al. |

FOREIGN PATENT DOCUMENTS

| | | | | |
|---|---|---|---|---|
| GB | 2478343 A | | 9/2011 | |
| GB | 2531051 A | * | 4/2016 | ......... C08G 59/4014 |
| WO | 2015/189310 A1 | | 12/2015 | |
| WO | 2016/116468 A1 | | 7/2016 | |

OTHER PUBLICATIONS

M.M. Jacobi, et al., "Study of the Epoxidation of Polydiene Rubbers II", KGK Kautschuk Gummi Kunststoffe 57. Jahrgang, Nr. Mar. 2004.

* cited by examiner

EPOXY-FUNCTIONALIZED NOVOLAK RESIN COMPOSITION

TECHNICAL FIELD OF THE INVENTION

The present invention pertains to the field of thermosetting resin compositions and of composites comprising such compositions. The invention also relates to a tyre comprising these laminates.

PRIOR ART

A tyre designated as radial essentially comprises a tread, two beads, each being reinforced with a bead wire, two side walls joining the beads to the tread, a carcass reinforcement extending from one bead to the other and wound around the two bead wires in each bead and comprising a turn-up disposed, for example, towards the outside of the tyre. A rigid crown reinforcement is disposed circumferentially between the carcass reinforcement and the tread.

The crown reinforcement generally—and conventionally—comprises the following elements:
- two crossed crown triangulation layers (or plies) consisting essentially of (generally metal) reinforcers that each make an angle of approximately 30 degrees with the circumferential direction of the tyre;
- a crown belt that consists essentially of reinforcers substantially parallel to the circumferential direction of the tyre, often referred to as 0 degree reinforcers even though they generally make a non-zero angle with the circumferential direction, for example an angle of between 0 and 10 degrees.

Numerous efforts have been made to improve the crown reinforcement of the tyre.

Document U.S. Pat. No. 5,837,077 describes a tyre comprising a belt which is formed by multiple spiral winding of a continuous strip around the outer circumference of the carcass layer, in the circumferential direction of the tyre. The strip comprises reinforcing threads covered with elastomeric materials, and initially it has an ovalized profile, necessitating a mechanical treatment stage for flattening the profile.

Document EP 0101400 describes a radial tyre having a plurality of semi-rigid annular strips disposed in a crown portion of the tyre. The strips extend substantially through the tread part of the tyre. The strips each comprise fibrous reinforcers incorporated in an epoxy resin composition, forming a semi-rigid hoop structure.

For tyre applications, the composition comprising the fibrous reinforcers making up these strips must have a glass transition temperature, $T_g$, which is sufficiently high—at least 160° C.—for the strip to withstand the stages of adhesive coating and curing of the tyre, and more particularly to retain its shape and its properties. The composition must also exhibit an elongation at break that is greater than that of the fibrous reinforcers, so as to maintain the integrity of the strips when they are subjected to stress. It is difficult, though, to find compositions, especially compositions based on epoxy resins, that have both a large elongation at break and a high $T_g$.

Furthermore, the composition must—before curing—have a viscosity which is sufficiently low for proper impregnation of the fibrous reinforcer, and high enough that it can be handled and shaped before curing of the strips.

Especially in the case of compositions based on epoxy resins, though, crosslinking begins as soon as the resin and the curing agent are contacted, so giving rise to a gradual increase in viscosity over time.

Most of the time, the curing agent is solid at ambient temperature, and so effective mixing of the resin and the curing agent requires alternatively that the curing agent be dissolved beforehand in a solvent—often an acetone or methyl ethyl ketone solvent, so necessitating the subsequent removal of the said solvent, adding one process stage—and/or that the composition be heated to a temperature generally of between 40 and 100° C., which increases the crosslinking rate and therefore the viscosity of the mixture.

It is important to find a composition which has a low crosslinking rate at ambient temperature, so that it can be stored from the time it is made up to the time it is used, a duration of at least several days, advantageously a week; this time during which the composition can be used is commonly termed the open time. It is therefore apparent that the composition and the strip comprising this composition have to meet a complex set of criteria. The properties of a mixture of resins, though, cannot be deduced simply from properties of the individual resins.

Copious research into thermosetting resin compositions has been conducted in the past.

Document GB 2478343 discloses a methylenebisaniline-type curing agent which allows a low crosslinking rate. However, the resins and the curing agent are physically separated, to allow the transport and the storage of the set.

Document U.S. Pat. No. 8,779,036 teaches compositions which have a good reactivity at the crosslinking temperatures, while having a low reactivity at the storage temperatures, with the said composition comprising an epoxy resin, a curing agent and an accelerator that consists of a quaternary ammonium salt or an organic or inorganic acid: a particularly complex composition.

Document CA 1,337,088 describes a thermosetting composition which has good processability qualities and can be kept over long periods, this composition comprising a specific resin composed predominantly of a tetraglycidyl compound, and an amine-type curing agent.

The applicant company, pursuing its research, has found a simple resin composition comprising a novolac epoxy resin fraction and a specific curing agent, with the said composition, unexpectedly, exhibiting viscosity characteristics which allow it to be kept and allowing the fibrous reinforcers to be impregnated before crosslinking, while having excellent stiffness qualities and a sufficiently high glass transition temperature after crosslinking. Accordingly, the compositions conformant to the present invention exhibit a processability/stiffness trade-off which is much better than that of the known compositions, and they are particularly suitable for use in the production of composites, especially composites for tyres.

Moreover, the stability and the low reactivity of the compositions of the invention at temperatures of as high as 100° C. allows the curing agent and the resins in the said composition to be liquefied, without any need for a solvent for dissolving the curing agent.

DETAILED DESCRIPTION OF THE INVENTION

The invention relates to a composition of epoxide-functionalized resins, comprising at least:
- a first epoxide-functionalized novolac resin based:
  - on at least one first aromatic polyphenol comprising at least one aromatic nucleus bearing at least two hydroxyl functions in the meta position relative to one another, the two positions ortho to at least one of the hydroxyl functions being unsubstituted, and on a compound comprising at least one aldehyde function;

a second epoxide-functionalized novolac resin based:

on at least one second aromatic polyphenol comprising at least one aromatic nucleus bearing at least one alkyl radical and at least two hydroxyl functions in the meta position relative to one another, the two positions ortho to at least one of the hydroxyl functions being unsubstituted, and on a compound comprising at least one aldehyde function;

and a curing agent selected from phenolic or amine-type curing agents;

the average molar mass of the group consisting of the entirety of the epoxidized novolac resins in the said composition being between 550 and 650 g/mol, the average epoxide functionality of the said group being between 3 and 3.5 eq epoxide/mol, and the said composition having a glass transition temperature $T_g$ of at least 160° C.

Definitions

In the present document, the expression composition "based on" is intended to mean a composition comprising the mixture and/or the reaction product of the various constituents used, some of these base constituents being capable of reacting or intended to react with one another, at least in part, during the various phases of manufacture of the composition, in particular during the crosslinking or vulcanization thereof.

In the present description, unless expressly indicated otherwise, all the percentages (%) indicated are weight percentages. The abbreviation "phr" signifies parts by weight per hundred parts of novolac epoxy resins, taking account of the entirety of the novolac epoxy resins present in the composition.

Furthermore, any interval of values denoted by the expression "between a and b" represents the range of values extending from more than a to less than b (that is to say, limits a and b excluded), whereas any interval of values denoted by the expression "from a to b" means the range of values extending from the limit "a" up to the limit "b" (that is to say including the strict limits "a" and "b"). In the present document, when an interval of values is denoted by the expression "from a to b", the interval represented by the expression "between a and b" is also and preferentially denoted.

When reference is made to a "predominant" compound, this is understood to mean, within the meaning of the present invention, that this compound is predominant among the compounds of the same type in the composition, that is to say that it is the one which represents the greatest amount by weight among the compounds of the same type, for example more than 50%, 60%, 70%, 80%, 90%, indeed even 100%, by weight, with respect to the total weight of the compound type. Thus, for example, a predominant reinforcing filler is the reinforcing filler representing the greatest weight relative to the total weight of the reinforcing fillers in the composition. On the contrary, a "minor" compound is a compound which does not represent the greatest mass fraction among the compounds of the same type.

"Approximately" means equal to plus or minus 10%, advantageously equal to plus or minus 5%, preferably equal to plus or minus 2%.

The open time denotes the time for which a resin composition can be used after mixing of the various constituents of the said composition. Beyond the open time, the resin composition can no longer be used for the intended application, more particularly because its viscosity is too high.

The term "molar equivalent", which is well known to those skilled in the art, should be understood as meaning the quotient between the number of moles of the compound or function concerned and the number of moles of the reference compound or function. Thus, 2 molar equivalents of the compound or function B relative to the compound or function A represent 2 mol of the compound or function B when one mole of the compound or function A is used.

In the present document, "strip covering", or overlap, means an arrangement in which the strips of a radially outer strip ply cover or overlap the strips of the radially inner strip ply, meaning that the projection in the radial direction of one strip over the lower-level strip is non-zero. The percentage of covering may vary according to embodiments. This covering forms a linkage between the plies of strips, producing a cohesion of the entirety of the crown reinforcing zone. This linkage in particular allows transmission of shear forces between the plies of strips. The presence of the rubber composition matrix is not taken into consideration in this positioning.

An "axial direction" means a direction parallel to the axis of rolling of the tyre.

A "tyre" means all types of resilient tyre systems, whether or not subject to an internal pressure.

The "tread" of a tyre means a quantity of elastomeric compound delimited by lateral surfaces and by two main surfaces, one of which is intended to come into contact with a road surface when the tyre is rolling.

The "sidewall" of a tyre means a lateral surface of the tyre, the said surface being disposed between the tread of the tyre and a bead of this tyre.

The "bead" of a tyre means a part of the tyre that is intended to be seated on a wheel rim.

In the present document, a "carcass", or "carcass ply", means a reinforcing structure for a tyre in the form of a layer made up of a matrix of elastomeric material in which filaments or threads, generally textile, are arranged in a substantially parallel and longitudinal alignment. The carcass ply is advantageously manufactured flat, in great lengths, then cut to the appropriate dimensions for the manufacture of a tyre to which the carcass ply is suited.

Within the context of the invention, the carbon products mentioned in the description may be of fossil or bio-sourced origin. In the latter case, they may be partially or totally derived from biomass or may be obtained from renewable starting materials derived from biomass. This relates especially to polymers, plasticizers, fillers, etc.

Novolac Epoxy Resins

The epoxy resins which can be used in the present invention are epoxide-functionalized novolac resins, also called novolac epoxy resins, namely epoxy resins obtained from an aldehyde and a polyphenol in acid medium, the polyphenol being in excess, and epoxidized.

One novolac-type resin is also called "two-step" (or "two-stage") resin, since it requires the use of a curing agent for crosslinking. The resin composition of the invention is thermosetting.

The expression "resin based on" should, of course, be understood as meaning a resin comprising the mixture and/or the product of the reaction between the various base constituents used for the final condensation of this resin, preferably solely the product of the reaction between the various base constituents used for this resin, it being possible for some of them to be intended to react or capable of reacting with one another or with their immediate chemical surroundings, at least partly, during the various phases of the process for the manufacture of the composition, of the composites or of the tyre, in particular during a curing stage. Thus, the base constituents are the reactants intended to react together during the final condensation of the resin and are not reagents intended to react together to form these base constituents.

The term "meta position relative to each other" means that the hydroxyl functions are borne by carbons of the aromatic nucleus which are separated from each other by a single other carbon of the aromatic nucleus.

The term "in the position ortho to a function" means the position occupied by the carbon of the aromatic nucleus which is immediately adjacent to the carbon of the aromatic nucleus bearing the function.

In one preferred embodiment, the said first aromatic polyphenol comprises at least one aromatic nucleus bearing three hydroxyl functions in the meta position with respect to one another.

The said first aromatic polyphenol preferably comprises an aromatic nucleus having 6 carbon atoms.

The said first aromatic polyphenol preferably comprises an aromatic nucleus bearing solely hydroxyl groups.

The said first aromatic polyphenol is very preferably selected from the group consisting of 1,3-benzenediol, commonly called resorcinol, and 1,3,5-benzenetriol, commonly called phloroglucinol.

The said second aromatic polyphenol preferably comprises an aromatic nucleus having 6 carbon atoms.

The said second aromatic polyphenol preferably comprises an aromatic nucleus bearing an alkyl radical comprising from 1 to 5 carbon atoms, advantageously from 1 to 4 carbon atoms, preferably from 1 to 3 carbon atoms, more preferably from 1 to 2 carbon atoms, and very preferably 1 carbon atom.

The said second aromatic polyphenol is very preferably selected from the group consisting of 4-methyl-1,3-benzenediol, commonly called 4-methyl resorcinol, and 4-methyl-1,3,5-benzenetriol, commonly called 4-methyl phloroglucinol.

The compound comprising at least one aldehyde function based on the said first novolac resin may be different or identical to the compound comprising at least one aldehyde function based on the said second novolac resin, while remaining within the context described below. In the remainder of the description, the term "the compound comprising at least one aldehyde function" therefore refers equally to the compound comprising at least one aldehyde function based on the said first novolac resin and the compound comprising at least one aldehyde function based on the said second novolac resin.

In one embodiment, the compound comprising at least one aldehyde function comprises—independently for the said first novolac resin and the said second novolac resin— an aromatic nucleus bearing at least one aldehyde function.

The said aromatic nucleus is selected from the group consisting of a benzene nucleus, a furan nucleus, a thiophene nucleus and a pyrrole nucleus, advantageously a benzene nucleus and a furan nucleus. The said aromatic nucleus advantageously also bears a carbonylalkyl and/or hydroxyalkyl radical.

A carbonylalkyl radical refers to a monovalent radical of formula —$C_nH_{2n}$—CHO, where "CHO" represents an aldehyde function in which the carbon is bonded by a double covalent bond to the oxygen atom and by a single covalent bond to the hydrogen atom, and n represents an integer of from 0 to 10, advantageously from 0 to 5, preferably from 0 to 3 and very preferably from 0 to 1. When n is 0, this signifies that the —CHO group is borne directly by the aromatic nucleus.

A hydroxyalkyl radical refers to a monovalent radical of formula —$C_nH_{2n}$—OH, where "OH" represents a hydroxyl group and n represents an integer of from 1 to 10, advantageously from 1 to 5, preferably from 1 to 3 and very preferably of 1.

In a preferred arrangement, the said aromatic nucleus bears two aldehyde functions, advantageously two hydrogenocarbonyl groups.

In another preferred arrangement, the said aromatic nucleus bears a hydroxyl function and a carbonyl function, advantageously a hydroxymethyl group and a hydrogenocarbonyl group.

The said compound comprising at least one aldehyde function is preferably selected—independently for the said first novolac resin and the said second novolac resin—from formaldehyde, furfuraldehyde, 2,5-furandicarboxaldehyde, 5-hydroxymethylfurfural, 1-hydroxymethylbenzene-4-carboxaldehyde, 1,2-benzenedicarboxaldehyde, 1,3-benzenedicarboxaldehyde and 1,4-benzenedicarboxaldehyde. The said compound comprising at least one aldehyde function is very preferably formaldehyde.

In accordance with the invention, the said first and second novolac resins are epoxide-functionalized. The epoxide functionalization is carried out in any way with which those skilled in the art are familiar, for example by processes based on chlorohydrin or on bromohydrin or processes based on hydrogen peroxides, on alkyl hydroperoxides or on peracids (such as peracetic acid or performic acid); see notably Kautsch. Gummi Kunstst., 2004, 57(3), 82, advantageously by reaction with epichlorohydrin.

Epoxidized novolac epoxy resins of this kind are on an individual basis well known to those skilled in the art and are available commercially. Examples include the cresol novolac epoxy resin Araldite ECN 1299 from Huntsman, or the phenol novolac epoxy resin Epikote 893 from Momentive.

The proportion of the said first and second epoxide-functionalized novolac resins in the resin composition of the invention is such that the average molar mass of the group consisting of the entirety of the novolac epoxy resins in the said composition is between 550 and 650 g/mol, and such that the average epoxide functionality of the said group is between 3 and 3.5 eq epoxide/mol, or else such that the mass per epoxide equivalent is between 190 and 220 g/eq epoxide.

Average epoxide functionality means the average number F of epoxide functions borne by one mole of epoxy resin.

The mass per epoxide equivalent, expressed in g/eq epoxide, is well known to those skilled in the art in the form "weight per epoxy equivalent" (WPE) and is the mass of epoxy resin comprising one epoxide functionality. The relationship between WPE and F is as follows:

$$WPE = M_n/F$$

where $M_n$ represents the weight-average molar mass of the epoxy resin in g/mol.

The mass epoxide content p of an epoxy resin is determined according to standard ASTM D-1652-04. The relationship between the mass content in weight % and WPE is as follows:

$$WPE = 43.100/p$$

The proportion of the said first and second epoxide-functionalized novolac resins in the resin composition of the invention is advantageously such that the molar ratio of the said second epoxide-functionalized novolac resin to the said first epoxide-functionalized novolac resin is between 1:4 and 1:1, advantageously between 1:3.5 and 1:1.5, preferably between 1:3 and 1:2.

Curing Agent

In accordance with the invention, the resin composition comprises a curing agent which is selected from phenolic and amine-type curing agents.

The curing agent used in the resin composition of the invention allows the said composition to be crosslinked when it is brought to an appropriate temperature, called the curing temperature. The curing temperature, of between 160 and 220° C., advantageously between 170 and 210° C. and very advantageously between 180 and 200° C., is advantageously attained rapidly, in other words with a temperature rise of at least 10° C./min, preferably 20° C./min and advantageously 30° C./min, so that the crosslinked composition has the desired $T_g$. Using lower temperatures allows complete crosslinking to be attained if the necessary time is observed, but the $T_g$ of the crosslinked composition will be lower than expected.

The said curing agent is selected so that, after mixing, the composition undergoes little or no crosslinking until it is used, in other words throughout the open time. The said curing agent must therefore have a low activity at ambient temperature, so that the open time is sufficient, and must be fairly active at the curing temperature, so that the resin composition undergoes complete crosslinking When the said curing agent is an amine-type curing agent, it comprises at least two primary amine functions located on at least one (that is, one or more) six-membered aromatic ring, the said at least one six-membered aromatic ring comprising:
   at least one primary amine function, and
   at least two radicals Ri, which are identical or different and selected from the group consisting of linear or branched $C_1$-$C_6$ alkyl radicals, halogens, and ethers, ketones and esters substituted by linear or branched $C_1$-$C_6$ alkyl radicals,
such that the at least one six-membered aromatic ring does not comprise a hydrogen atom located in the ortho position relative to the primary amine functions, the said amine-type curing agent comprising at least one second primary amine function located on the said at least one six-membered aromatic ring or on an optional second six-membered aromatic ring of the said amine-type curing agent.

In other words, the amine-type curing agent comprises one or more six-membered aromatic rings and at least two primary amine functions located on just one or distributed over two or more of these six-membered aromatic rings.

In a way well known to those skilled in the art, a primary amine function is an amine-type function in which the nitrogen atom is bonded to two hydrogen atoms.

The amine-type curing agent preferably comprises from 1 to 3, more preferably 1 or 2, six-membered aromatic rings.

The amine-type curing agent preferably comprises from 2 to 4, more preferably 2, primary amine functions located on at least one six-membered aromatic ring of the amine-type curing agent.

The halogens which are possible candidates for the radicals $R_i$ are advantageously selected from the group consisting of fluorine, chlorine, bromine and iodine atoms. The halogens are preferably selected from the group consisting of chlorine and bromine atoms; more preferably, the halogens are chlorine atoms.

According to a first embodiment of the present invention, the amine-type curing agent may comprise a six-membered aromatic ring comprising:
   at least two primary amine functions, and
   at least two radicals $R_i$, which are identical or different and selected from the group consisting of linear or branched $C_1$-$C_6$ alkyl radicals, halogens, and ethers, ketones and esters substituted by linear or branched $C_1$-$C_6$ alkyl radicals,
such that the said ring does not comprise a hydrogen atom located in the ortho position relative to the primary amine functions.

According to a second embodiment of the present invention, the amine-type curing agent may also comprise at least two identical or different six-membered aromatic rings, the said rings each comprising:
   at least one primary amine function, and
   at least two radicals $R_i$, which are identical or different and selected from the group consisting of linear or branched $C_1$-$C_6$ alkyl radicals, halogens, and ethers, ketones and esters substituted by linear or branched $C_1$-$C_6$ alkyl radicals,
such that the said rings do not comprise a hydrogen atom located in the ortho position relative to the primary amine functions.

According to another embodiment, the amine-type curing agent may also comprise two or more six-membered aromatic rings and at least two primary amine functions located solely on one of the aromatic rings.

When the amine-type curing agent comprises two or more (that is, at least two) six-membered aromatic rings, these rings may be identical or different. They can, for example, differ from one another in the nature of the atoms constituting the said rings and/or in the number of primary amine functions located on the said rings and/or in the nature and/or the number of the Ri radicals positioned on the said rings and/or in the position of the primary amine functions and Ri radicals on the said rings. When the amine-type curing agent comprises two or more six-membered aromatic rings, these rings are preferably identical.

In the expression "ethers, ketones and esters substituted by linear or branched C1-C6 alkyl radicals", those skilled in the art clearly understand that the terms "substituted by linear or branched C1-C6 alkyl radicals" relate to each of the ethers, ketones and esters.

Whatever the embodiment of the present invention, the amine-type curing agent preferably comprises at least two radicals $R_i$ which are identical or different and selected from the group consisting of linear or branched C1-C6 alkyl radicals, halogens, and ethers, substituted by linear or branched C1-C6 alkyl radicals, and advantageously selected from the group consisting of linear or branched C1-C6 alkyl radicals and halogens.

The radicals $R_i$ are very preferably selected—identically or differently—from the group consisting of methyl, ethyl and propyl radicals and chlorine atom.

Whatever the embodiment of the present invention, the atoms in the aromatic rings of the amine-type curing agent may be carbon atoms, and may optionally comprise nitrogen atoms. Preferably, all the atoms of the aromatic rings of the amine-type curing agent are carbon atoms. In other words, the six-membered aromatic rings of the amine-type curing agent are preferably aromatic rings comprising six carbon atoms.

Particularly preferred curing agents include 4,4'-methylenebis(2,6-diethylaniline) (MDEA), 4,4'-methylenebis(2,6-diisopropylaniline) (MDIPA), 4,4'-methylenebis(2-isopropyl-6-methylaniline) (MMIPA), 4,4'-methylenebis(3-chloro-2,6-diethylaniline) (MCDEA) and 2,4,6-trimethyl-1,3-phenylenediamine.

Examples of amine-type curing agents which are commercially available and can be used in the context of the present invention include, for example, Lonzacure MDIPA, Lonzacure MDEA or Lonzacure MCDEA from Lonza, and 2,4,6-trimethyl-1,3-phenylenediamine from Sigma Aldrich.

The amount of amine-type curing agent in the composition of the invention is adjusted so that there are two molar equivalents of epoxide per amine function. Beyond this value, crosslinking will not be complete and the $T_g$ of the crosslinked composition will be lower than the anticipated $T_g$.

When the said curing agent is a phenolic curing agent, it comprises at least two hydroxyl functions located on at least one (that is, one or more) aromatic ring having six carbon atoms, at least one position ortho to each of the said hydroxyl functions being unsubstituted.

The said phenolic curing agent advantageously comprises one or two aromatic rings having six carbon atoms, preferably one aromatic ring having six carbon atoms.

In a preferred arrangement, the said phenolic curing agent comprises at least three hydroxyl functions.

The said phenolic curing agent is very preferably selected from 1,3-dihydroxybenzene (resorcinol), 1,2-dihydroxybenzene (catechol), 1,3,5-trihydroxybenzene (phloroglucinol), 2-methyl-1,3,5-trihydroxybenzene and 4,4'-thiodiresorcinol (resorcinol sulphide); very advantageously, the said phenolic curing agent is phloroglucinol.

The amount of phenolic curing agent in the composition of the invention is adjusted so that there are from 0.5 to 1.5 molar equivalents of epoxide per hydroxyl function, more preferably from 0.75 to 1.25 molar equivalents, advantageously from 0.9 to 1.1 molar equivalents, and very advantageously 1 molar equivalent of epoxide per hydroxyl function.

The curing agent as described above means that the composition of the invention can undergo complete reaction only when it is brought to a sufficient temperature allowing the composition of the invention to be cured, during which the curing agent and the resin fraction of the said composition crosslink completely, and allows satisfactory properties to be retained at ambient temperature, especially in terms of viscosity, over the whole of the open time. Accordingly, the composition of the invention has an open time of at least 5 days, and advantageously of at least a week.

The resin composition may therefore take the form of a mixture of phenol and cresol novolac epoxy resins and of a curing agent which have not yet reacted with one another, or else may take the form of a mixture of phenol and cresol novolac epoxy resins and of a curing agent which have partially reacted with one another, or else, further still, may take the form of a mixture of phenol and cresol novolac epoxy resins and of a curing agent where at least one of them has reacted completely with the other.

Additives

The resin composition of the invention advantageously comprises reinforcing fillers (silica, carbon black), elastomeric fillers (Kane Ace, from Kaneka) or thermoplastic fillers. The resin composition of the invention preferably comprises thermoplastic fillers such as thermoplastic microbeads. An example of thermoplastic microbeads useful for the purposes of the invention is the PA12 powder sold by Arkema under the name Orgasol.

When a reinforcing, elastomeric or thermoplastic filler is used, advantageously a thermoplastic filler, it is used in amounts of between 0.1 and 1.5 phr, advantageously between 0.2 and 1 phr. Below 0.1 phr, the effect of the presence of the filler is not perceptible. Above 1.5 phr, the increase in viscosity or drop in the glass temperature of the crosslinked composition is too large.

The addition, especially of a thermoplastic filler, allows an increase in the viscosity of the raw—that is, pre-cure—composition and also an increase in the elongation at break of the crosslinked composition, albeit at the expense of the glass transition temperature of the crosslinked composition, which goes down.

The resin compositions of the invention in the raw state have viscosities which allow the said compositions to be used, especially for producing composites, which by virtue of their stability can be kept for at least 5 days at ambient temperature. The stability of the compositions of the invention also allows the resins and the curing agent to be mixed without any need to use a solvent to dissolve either of them.

Moreover, in the cured state, in other words after polymerization, the compositions of the invention have high glass transition temperatures, of at least 160° C., and a large elongation at break, greater than that of the fibres employed in producing composites.

Composite

A further subject of the invention is a composite based on at least one fibre and on the resin composition of the invention.

A fibre is understood to mean an element exhibiting a length at least 10 times greater than the greatest dimension of its section, irrespective of the shape of the latter: circular, elliptical, oblong, polygonal, in particular rectangular or square or oval. In the case of a rectangular section, the fibre has the shape of a band.

The fibre may be metallic or textile.

A metallic fibre may be a metallic elementary monofilament. A metallic elementary monofilament of this kind comprises a steel core, optionally coated with one or more layers of a coating which may comprise a metal selected from zinc, copper, tin, cobalt and alloys of these metals.

A metallic fibre may be an assembly of two or more metallic elementary monofilaments as are described above, assembled together in a helix, for example by cabling or twisting of the metallic elementary monofilaments in order to form, for example, layered cords comprising two or more concentric layers of metallic elementary monofilaments, or stranded cords, each strand comprising two or more concentric layers of metallic elementary monofilaments.

A textile fibre may be a textile elementary monofilament. This textile elementary monofilament is obtained, for example, by melt spinning, solution spinning or gel spinning. Each textile elementary monofilament is made from an organic material, especially polymeric material, or inorganic material, such as, for example, glass, quartz, basalt or carbon. The polymeric materials may be of the thermoplastic type, for instance aliphatic polyamides, notably polyamides 6-6, and polyesters, notably polyethylene terephthalate. The polymeric materials may be of the non-thermoplastic type, for instance aromatic polyamides, notably aramid, and cellulose, either natural or artificial, notably rayon. Each textile elementary monofilament exhibits a substantially circular section exhibiting a diameter ranging, for example, from 2 μm to 100 μm.

A textile fibre may be an assembly of two or more textile elementary monofilaments as are defined above, also referred to as yarn. A yarn preferably comprises more than 10 textile elementary monofilaments, preferably more than 100 textile elementary monofilaments and more preferably more than 500 textile elementary monofilaments.

A textile fibre may also be an assembly of two or more yarns as defined above.

The said textile fibre is advantageously a polyester fibre, advantageously a polyethylene terephthalate fibre, or polyamide, glass, carbon, quartz or basalt fibre.

The said textile fibre is advantageously coated with one or more layers of a bonding agent, commonly referred to as size, which are adapted to the composition of the invention based on novolac epoxy resins.

In one preferred arrangement, the composite comprises a plurality of fibres arranged side by side in a main direction.

In another preferred arrangement, the composite comprises a plurality of fibres assembled as knitted or as woven fabrics.

A knitted fabric is an assembly of fibres as defined above and comprising meshes formed by one or more of these fibres. Each mesh comprises a loop interlaced with another loop. Mention may be made, for example, of knitted fabrics with a jersey or English rib structure for weft-knitted fabrics and knitted fabrics with a locknit or atlas structure for warp-knitted fabrics.

A woven fabric is an assembly of a first family of fibres, known as warp fibres, substantially parallel to one another, and of a second family of fibres, known as weft fibres, substantially parallel to one another. Preferably, the fibres of the first family are substantially perpendicular to the fibres of the second family.

The resin composition of the invention is particularly suitable for producing composites of "prepreg" type, with which those skilled in the art are familiar; in the course of such production, the at least one fibre is impregnated in a mould with the resin composition of the invention. For this purpose, and as known to those skilled in the art, it is therefore essential that the viscosity of the resin composition of the invention in the raw state, in other words before curing, is sufficiently low for proper impregnation of the said at least one fibre, and sufficiently high for hot impregnation to be carried out uniformly, without the composition running outside or on the impregnating device—accordingly, the viscosity should be between 2.5 and 10 Pa·s, advantageously between 2.5 and 9 Pa·s, measured at 65° C.

The composite of the invention is produced by impregnating the fibre or fibres with the resin composition of the invention, irrespective of the embodiment, and more particularly irrespective of the arrangement of the fibre or fibres.

The composite in accordance with the invention may be in the raw state (before crosslinking) or in the cured state (after crosslinking). The composite is cured after the said at least one fibre has been contacted with the resin composition of the invention.

The composite in accordance with the invention is advantageously shaped, in the form of a layer of composite. A layer of composite refers to the composite of the invention in the form of an element for which the length and the width are greater than the thickness by a factor of at least 10.

Semi-Finished Article

A further subject of the invention is a semi-finished article comprising a composite of the invention covered with a rubber composition matrix.

The said rubber composition matrix is based on at least one diene or non-diene (for example thermoplastic) elastomer; this is preferably a composition of the crosslinked or crosslinkable type, meaning that it then comprises a crosslinking system (notably a vulcanizing system) suitable for enabling the composition to crosslink (harden) as it cures (or as the rubber article cures, such as a tyre incorporating a crown zone according to the invention).

Tyre A further subject of the invention is a tyre comprising a composite, a composition, or a semi-finished article of the invention.

In particular, the invention relates to a tyre comprising a carcass ply joining two beads via two side walls, the said carcass ply being topped radially towards the outside of the tyre by a crown reinforcement zone, which is itself topped radially towards the outside of the tyre by a tread, the crown reinforcement zone comprising a plurality of reinforcing strips disposed on at least two strip plies, a first strip ply radially on the inside and a second strip ply radially on the outside, with the strips of the said second strip ply covering the strips of the said first strip ply by at least 20%, the said strips of the said first and second strip plies being arranged in juxtaposition and with an angle of between 0 and 10° with respect to the circumferential direction, each strip ply being embedded in a rubber composition matrix which in the crosslinked state exhibits a secant tensile modulus in extension at 10% elongation of more than 10 MPa, characterized in that the reinforcing strips consist of a laminate of at least two layers of composites according to any of the arrangements of the invention, covered with a polymeric matrix.

Figure 1:
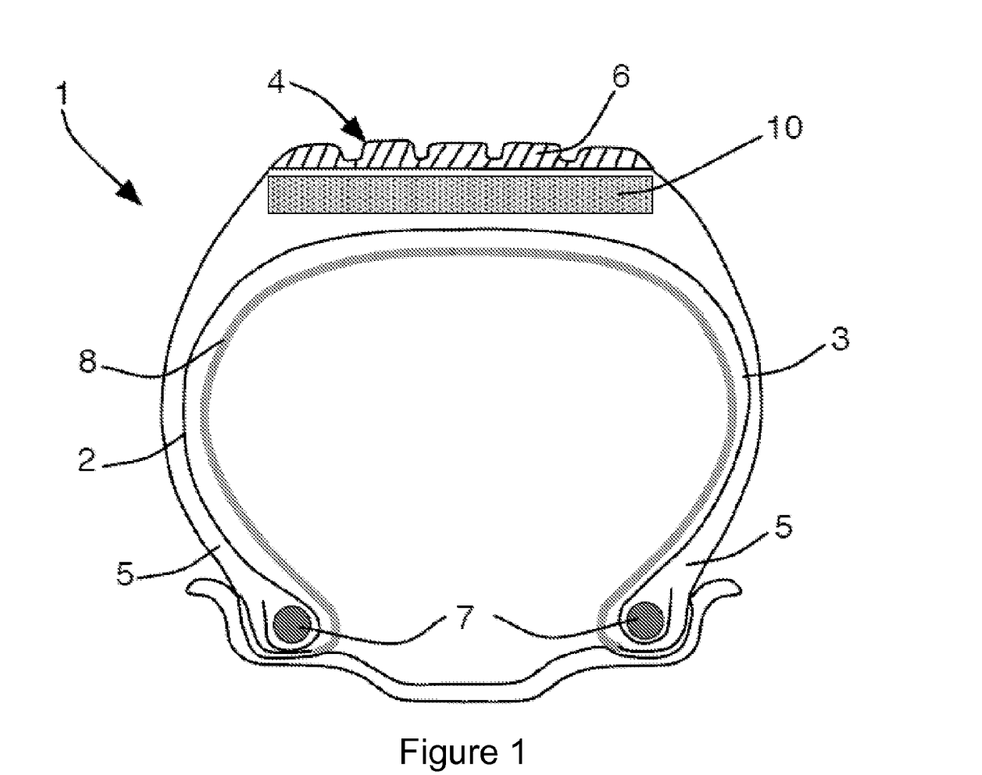
FIG. 1 shows a tyre 1 according to the invention, comprising sidewalls 3 surmounted by a crown 4 and a carcass 2 extending from one bead 5 to the other, passing via the sidewalls 3 and the crown 4. At the crown 4, more specifically between the carcass 2 and the tread 6, the tyre provides a crown reinforcing zone 10 provided with circumferential strips, that is to say strips oriented substantially at 0° with respect to the circumferential direction.
Figure 2:
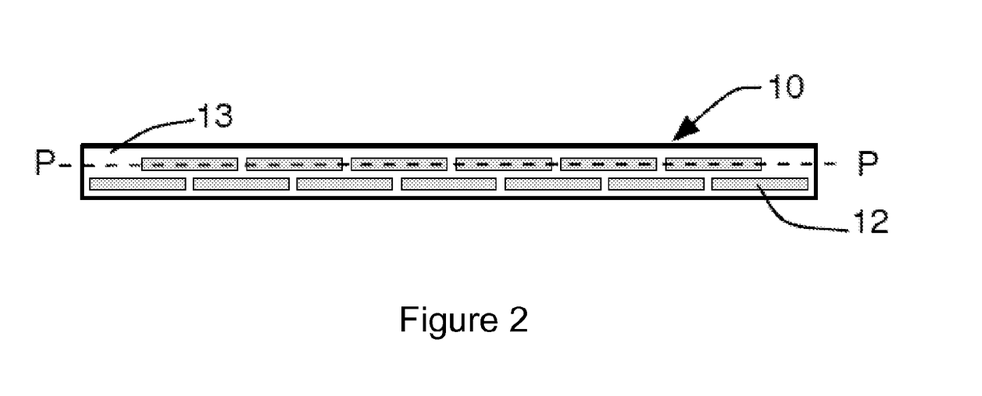
Figure 3:
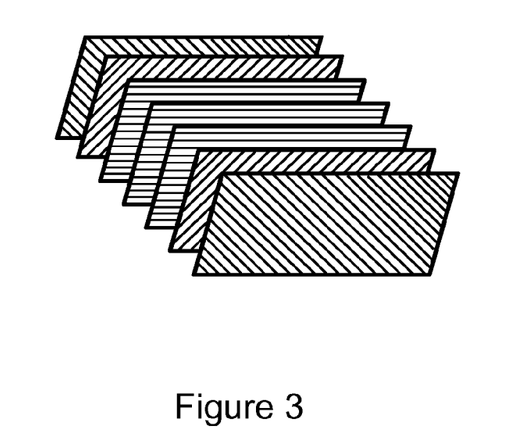
FIG. 3 illustrates an embodiment in which n is 3 and m is 2.

The laminate has a longitudinal median plane (P) disposed at half the height of the laminate (the height being in the radial direction of the tyre) as shown in FIG. 2.

For producing the laminate, the layers of composites of the invention are applied raw or unpolymerized in accordance with the desired lamination angles, and form a sheet.

The laminated sheet is cut into raw or unpolymerized strips of a desired width.

The raw strips are wound off onto a drum of large diameter (i.e. 2 metres in diameter). The strips are cured at low pressure (0.03 bar relative) and a temperature of between 160 and 220° C., with a temperature-increase ramp of at least 10° C./min, preferably 20° C./min and advantageously 30° C./min, by means of the customary curing peripherals (such as peel ply, bleeder cloth, microperforated or unperforated release film, vacuum-bagging film, etc.).

According to another embodiment, the laminated sheet is placed onto a large-diameter drum and cured at low pressure (0.03 bar relative) and a temperature of between 160 and 220° C., with a temperature-increase ramp of at least 10° C./min, preferably 20° C./min and advantageously 30° C./min, with the aid of the customary curing peripherals. After curing, the sheet is cut into strips.

As a preference, the strips have a thickness less than or equal to 1 mm, and more preferably less than or equal to 0.7 mm.

The composite layer preferably has a surface mass of approximately 200 g/m² and a pre-curing thickness of approximately 0.2 mm.

The composite layer preferably has a surface mass of less than or equal to 80 g/m², more preferably of between 18 g/m² and 80 g/m², and a pre-curing thickness of less than 0.06 mm.

When the said composite layer comprises polyethylene terephthalate fibres, these fibres are advantageously predominant, meaning that they represent more than 50% of the fibres of any one layer. With particular preference the fibres in the layer consist of polyethylene terephthalate. In this variant, the volume ratio of resin composition to fibres in the composite layer is advantageously between 25:75 and 55:45, and preferably is approximately 45:55.

According to other preferred embodiment variants of the invention, the fibres in each layer of composite comprise polyamide fibres (such as semi-aromatic PA66, PA46, PA6, PA10), cellulose or rayon fibres, or else low-modulus thermoplastic fibres; each of these types of fibres can be used preferably in predominance, meaning that they represent more than 50% of the fibres in any one layer, and more preferably each of these types of fibres makes up the entirety of the fibres in the layer of composite. In these variants, the volume ratio of resin composition to fibres in the composite layer is advantageously between 25:75 and 55:45, and preferably is approximately 45:55.

According to one preferred embodiment variant of the invention, the said layer of composite comprises glass fibres. The glass fibres are preferably predominant, meaning that they represent more than 50% of the fibres of any one layer. The fibres in the layer preferably consist of glass fibres. In this variant, the volume ratio of resin composition to fibres in the composite layer is advantageously between 35:65 and 70:30, and preferably is approximately 45:55.

Whatever the variant of the invention, the fibres must have a melting point of more than 180° C., preferably more than 200° C., very preferably more than 220° C.

According to another preferred embodiment variant of the invention, the said layer of composite comprises carbon fibres. The carbon fibres are preferably predominant, meaning that they represent more than 50% of the fibres of any one layer. The fibres in the layer preferably consist of carbon fibres. In this variant, the volume ratio of resin composition to fibres in the composite layer is advantageously between 35:65 to 60:40, and preferably is approximately 50:50.

According to other preferred embodiment variants of the invention, the fibres comprise aramid fibres, basalt fibres or quartz fibres.

According to one preferred embodiment variant of the invention, the strips are arranged in four strip plies, with the strips of each strip ply covering the strips of the strip ply radially on the inside of it by at least 20% and at most 80%.

According to one preferred embodiment of the invention, the said laminate comprises:
  n interior composite layers having fibres for which the angle with the circumferential direction is 0°, n being a number greater than or equal to 1, preferably ranging from 1 to 20, more preferably ranging from 1 to 12, more preferably still from 1 to 6, these interior composite layers being juxtaposed with one another and flanked on each side respectively by m exterior composite layers,
  each exterior composite layer having fibres which form an angle α other than 0° with the circumferential direction, m ranging from 1 to 8, the angle α of the fibres of the successive exterior composite layers disposed on the one same side of the interior composite layers being identical or different, and the angle α of the fibres of two exterior composite layers disposed symmetrically on each side of the interior composite layers being identical.

The total number of layers in the laminate is therefore n+2 m.

According to a preferred embodiment of the invention, n and m are equal to 1. More preferably, the angle α of the fibres in the exterior composite layers is equal to 45° or to −45°.

According to another embodiment of the invention, n is equal to 1 and m is equal to 2.

As a greater preference, the angle α of the fibres of the two exterior juxtaposed layers is equal to 45° or to −45°.

According to another embodiment of the invention, the laminate comprises:
  n interior composite layers having fibres for which the angle with the circumferential direction is 0°, n being a number greater than or equal to 3, preferably ranging from 3 to 20, more preferably ranging from 3 to 12, more preferably still from 3 to 6, these interior composite layers being juxtaposed with one another and flanked on each side respectively by m exterior composite layers,
  each exterior composite layer having fibres which form an angle α other than 0° with the circumferential direction, m ranging from 1 to 8, the angle α of the fibres of the successive exterior composite layers disposed on the one same side of the interior composite layers being identical or different, and the angle α of the fibres of two exterior composite layers disposed symmetrically on each side of the interior composite layers being identical in terms of absolute value, but of opposite sign.

According to another embodiment of the invention, the laminate comprises at least two composite layers, each composite layer comprising fibres which are parallel to one another and forming an angle α of other than 0° with the circumferential direction, such that the angle formed with the circumferential direction by the fibres of one of the composite layers is opposite to the angle formed with the circumferential direction by the fibres of the other composite layer, the said fibres of each composite layer being covered with a polymeric matrix, and the said laminate comprising an even number n of composite layers, and the sum of the angles formed with the circumferential direction by the fibres of all of the composite layers disposed radially on the same side of the median plane (P) of the laminate is equal in absolute value to the sum of the angles formed with the circumferential direction by the fibres of all of the composite layers disposed radially on the other side of the median plane (P) of the laminate, and the sum of the angles formed with the circumferential direction by the fibres of the n composite layers is 0°. In one preferred arrangement of this embodiment, the angle α of the fibres in the radially outermost composite layers is equal to 45° or to −45°.

Rubber Composition Matrix

The rubber composition matrix is based on at least one diene or non-diene (for example thermoplastic) elastomer; this is preferably a composition of the crosslinked or crosslinkable type, which is to say that it then comprises a crosslinking system (notably a vulcanizing system) suitable for allowing the composition to crosslink (harden) as it is being cured (or as the rubber item such as the tyre incorporating a crown zone according to the invention is being cured).

A feature of this rubber composition matrix is preferably its stiffness, meaning that it has a secant tensile modulus in extension at 10% elongation, referred to as modulus ME10, of greater than or equal to 10 MPa.

According to another preferred embodiment variant of the invention, this rubber composition matrix may also exhibit a very high stiffness, namely a modulus ME10 of greater than or equal to 30 MPa.

Preferably, the elastomer is a diene elastomer. As is known, diene elastomers can be classified into two categories: "essentially unsaturated" or "essentially saturated". The term "essentially unsaturated" is understood to mean a diene elastomer resulting at least in part from conjugated diene monomers having a content of units of diene origin (conjugated dienes) which is greater than 15% (mol %); thus it is that diene elastomers such as butyl rubbers or copolymers of dienes and of alpha-olefins of EPDM type do not come under the above definition and can especially be described as "essentially saturated" diene elastomers (low or very low content of units of diene origin, always less than 15%). In the category of "essentially unsaturated" diene elastomers, a "highly unsaturated" diene elastomer in particular refers to a diene elastomer having a content of units of diene origin (conjugated dienes) which is greater than 50%.

Although it is applicable to any type of diene elastomer, the present invention is preferably carried out with a diene elastomer of the highly unsaturated type.

This diene elastomer is more preferably selected from the group consisting of polybutadienes (BRs), natural rubber (NR), synthetic polyisoprenes (IRs), butadiene copolymers, isoprene copolymers and mixtures of these elastomers, such copolymers being notably selected from the group consisting of butadiene/styrene copolymers (SBRs), isoprene/butadiene copolymers (BIRs), isoprene/styrene copolymers (SIRs) and isoprene/butadiene/styrene copolymers (SBIRs).

The rubber composition may contain a single diene elastomer or several diene elastomers, the latter possibly being used in combination with any type of synthetic elastomer other than a diene elastomer, or even with polymers other than elastomers. The rubber composition can also comprise all or part of the additives known to those skilled in the art and normally used in rubber compositions intended for the manufacture of tyres, such as, for example, reinforcing fillers, such as carbon black or silica, coupling agents, non-reinforcing fillers, plasticizers (plasticizing oils and/or plasticizing resins), pigments, protective agents, such as antiozone waxes, chemical antiozonants, antioxidants, antifatigue agents or reinforcing resins (such as described, for example, in application WO 02/10269), a crosslinking system, for example based on sulphur and other vulcanizing agents and/or on peroxide and/or on bismaleimide.

A person skilled in the art will know, in the light of the present description, how to adjust the formulation of the rubber composition in order to achieve the desired levels of properties (in particular modulus ME10) and to adapt the formulation to the specific application envisaged.

It is well known to increase the stiffness of rubber compositions by increasing for example their content of reinforcing filler, the content of sulphur and other vulcanizing agents, or else by introducing reinforcing resins, it being possible for all of these solutions to be combined in order to obtain higher stiffnesses.

The space in the radial (or thickness) direction between two successive plies of strips and occupied by the matrix of rubber composition is preferably comprised between 0.05 and 2 mm, more preferably between 0.1 and 1 mm. For example, thicknesses of 0.2 to 0.8 mm have proved to be perfectly suitable for reinforcing a tyre.

Plies of Strips

In a ply of strips, the staggered arrangement of the strips is realized for example by first winding-off starting at a given azimuth, and second winding-off with an identical path starting at 180 degrees. As an alternative, the strips are positioned by first winding-off in one given axial direction, followed by second winding-off in the opposite axial direction.

In a variant, the starting and end points of the plies of strips may optionally be the same, in order to ensure a certain uniformity.

DESCRIPTION OF THE FIGURES

FIG. 2 illustrates an embodiment of a crown zone 10 according to the invention. In the embodiment of FIG. 2, a plurality of strips 12 make up two plies of strips, a first strip ply radially on the inside and a second strip ply radially on the outside, the strips of the said second strip ply covering the strips of the said first strip ply by at least 20%, with the said strips 12 of the said first and second strip plies being disposed in juxtaposition and with an angle, with respect to the circumferential direction, of substantially close to 0 degrees, and more broadly at an angle of less than substantially 12 degrees of the circumferential direction. Each of these plies of strips is embedded in a rubber composition matrix 13 which, in the crosslinked state, has a secant tensile modulus in extension at 10% elongation of greater than or equal to 10 MPa.

Thus, without this being limiting, the subject of the invention is at least one of the following embodiments:

1. A composition of epoxide-functionalized resins, comprising at least:
   a first epoxide-functionalized novolac resin based:
      on at least one first aromatic polyphenol comprising at least one aromatic nucleus bearing at least two hydroxyl functions in the meta position relative to one another, the two positions ortho to at least one of the hydroxyl functions being unsubstituted, and
      on a compound comprising at least one aldehyde function;
   a second epoxide-functionalized novolac resin based:
      on at least one second aromatic polyphenol comprising at least one aromatic nucleus bearing at least one alkyl radical and at least two hydroxyl functions in the meta position relative to one another, the two positions ortho to at least one of the hydroxyl functions being unsubstituted, and
      on a compound comprising at least one aldehyde function;
   and a curing agent selected from phenolic or amine-type curing agents;
   the average molar mass of the group consisting of the entirety of the epoxidized novolac resins in the said composition being between 550 and 650 g/mol, the average epoxide functionality of the said group being between 3 and 3.5 eq epoxide/mol, and the said composition having a glass transition temperature $T_g$ of at least 160° C.

2. A resin composition according to the preceding embodiment, in which the said first aromatic polyphenol comprises at least one aromatic nucleus bearing three hydroxyl functions in the meta position relative to one another.

3. A resin composition according to either of the preceding embodiments, in which the said first aromatic polyphenol comprises an aromatic nucleus bearing only hydroxyl groups.

4. A composition according to the preceding embodiment, in which the said first aromatic polyphenol is selected from the group consisting of 1,3-benzenediol, commonly called resorcinol, and 1,3,5-benzenetriol, commonly called phloroglucinol.

5. A resin composition according to any one of the preceding embodiments, in which the said second aromatic polyphenol comprises an aromatic nucleus bearing an alkyl radical comprising from 1 to 5 carbon atoms.
6. A resin composition according to any one of the preceding embodiments, in which the compound comprising at least one aldehyde function comprises—independently for the said first novolac resin and the said second novolac resin—an aromatic nucleus bearing at least one aldehyde function.
7. A composition according to the preceding embodiment, in which the said aromatic nucleus also bears a carbonylalkyl and/or hydroxyalkyl radical.
8. A composition according to either of embodiments 6 to 7, in which the said aromatic nucleus bears two aldehyde functions.
9. A composition according to either of embodiments 6 to 7, in which the said aromatic nucleus bears one hydroxyl function and one carbonyl function.
10. A composition according to any one of the preceding embodiments, in which the molar ratio of the said second epoxide-functionalized novolac resin to the said first epoxide-functionalized novolac resin is between 1:4 and 1:1.
11. A composition according to any one of the preceding embodiments, comprising between 0.1 and 1.5 phr (parts by weight per hundred parts of novolac epoxy resins) of a reinforcing, elastomeric or thermoplastic filler.
12. A composition according to any one of the preceding embodiments, in which the said amine-type curing agent comprises at least two primary amine functions located on at least one six-membered aromatic ring, the said at least one six-membered aromatic ring comprising:
    at least one primary amine function, and
    at least two radicals Ri, which are identical or different, and selected from the group consisting of linear or branched $C_1$-$C_6$ alkyl radicals, halogens, and ethers, ketones and esters substituted by linear or branched $C_1$-$C_6$ alkyl radicals,
such that the at least one six-membered aromatic ring does not comprise a hydrogen atom located in the ortho position relative to the primary amine functions, the said amine-type curing agent comprising at least one second primary amine function located on the said at least one six-membered aromatic ring or on an optional second six-membered aromatic ring of the said amine-type curing agent.
13. A composition according to the preceding embodiment, in which the said amine-type curing agent comprises from 1 to 3 six-membered aromatic rings.
14. A composition according to any one of embodiments 1 to 13, in which the said amine-type curing agent comprises from 2 to 4 primary amine functions located on at least one six-membered aromatic ring of the amine-type curing agent.
15. A composition according to any one of embodiments 1 to 14, in which the halogens which are possible candidates for the radicals $R_i$ are selected from the group consisting of fluorine, chlorine, bromine and iodine atoms.
16. A composition according to any one of embodiments 1 to 15, in which the amount of curing agent is adjusted so that there are two molar equivalents of epoxide per amine function.
17. A composition according to any one of embodiments 1 to 11, in which the said phenolic curing agent comprises at least two hydroxyl functions located on at least one aromatic ring having six carbon atoms, at least one position ortho to each of the said hydroxyl functions being unsubstituted.
18. A composition according to the preceding embodiment, in which the said phenolic curing agent comprises one or two aromatic rings having six carbon atoms.
19. A composition according to either of embodiments 17 to 18, in which the said phenolic curing agent comprises at least three hydroxyl functions.
20. A composition according to any one of embodiments 17 to 19, in which the amount of curing agent is adjusted so that there are between 0.5 and 1.5 molar equivalents of epoxide per hydroxyl function.
21. A composite comprising a composition according to any one of embodiments 1 to 20 and at least one fibre.
22. A composite according to the preceding embodiment, in which the said fibre is made of a material selected from organic or inorganic materials.
23. A composite according to either of embodiments 21 to 22, in which the said fibre is made of a material selected from aliphatic polyamides, polyesters, aromatic polyamides, cellulose, natural fibre, rayon, glass, quartz, basalt or carbon.
24. A semi-finished article comprising a composite according to any one of embodiments 21 to 23, covered with a rubber composition matrix.
25. A tyre comprising a composition according to any of embodiments 1 to 20 or a composite according to any of embodiments 21 to 23 or a semi-finished article according to embodiment 24.
26. A tyre comprising a carcass ply joining two beads via two side walls, the said carcass ply being topped radially towards the outside of the tyre by a crown reinforcement zone, which is itself topped radially towards the outside of the tyre by a tread, the crown reinforcement zone comprising a plurality of reinforcing strips disposed on at least two strip plies, a first strip ply radially on the inside and a second strip ply radially on the outside, with the strips of the said second strip ply covering the strips of the said first strip ply by at least 20%, the said strips of the said first and second strip plies being arranged in juxtaposition and with an angle of between 0 and 10° with respect to the circumferential direction, each strip ply being embedded in a rubber composition matrix which in the crosslinked state exhibits a secant tensile modulus in extension at 10% elongation of more than 10 MPa, characterized in that the reinforcing strips consist of a laminate of at least two layers of composites according to any one of embodiments 21 to 23, covered with a polymeric matrix.
27. A tyre according to embodiment 26, in which the said laminate comprises:
    n layers of composites according to any one of embodiments 21 to 23, referred to as interior layers, having fibres which are parallel to one other and for which the angle with the circumferential direction is 0°, n being a number greater than or equal to 1, these interior layers being juxtaposed with one another and flanked on each side respectively by m composite layers according to any one of embodiments 21 to 23, referred to as exterior layers,
    each exterior layer having fibres which are parallel to one other and form an angle α other than 0° with the circumferential direction, m ranging from 1 to 8, the angle α of the fibres of the successive exterior layers disposed on the one same side of the interior layers being identical or different, and the angle α of the fibres of two exterior layers disposed symmetrically on each side of the interior layers being identical.
28. A tyre according to the preceding embodiment, in which the number n is from 1 to 20.
29. A tyre according to embodiment 26, in which the said laminate comprises:

n layers of composites according to any one of embodiments 21 to 23, referred to as interior layers, having fibres which are parallel to one other and for which the angle with the circumferential direction is 0°, n being a number greater than or equal to 3, these interior layers being juxtaposed with one another and flanked on each side respectively by m composite layers according to any one of embodiments 21 to 23, referred to as exterior layers, each exterior layer having fibres which are parallel to one other and form an angle α other than 0° with the circumferential direction, m ranging from 1 to 8, the angle α of the fibres of the successive exterior layers disposed on the one same side of the interior layers being identical or different, and the angle α of the fibres of two exterior layers disposed symmetrically on each side of the interior layers being identical in terms of absolute value, but of opposite sign.

30. A tyre according to the preceding embodiment, in which the number n is from 3 to 20.
31. A tyre according to embodiment 26, in which the said laminate comprises at least two composite layers, each composite layer comprising fibres which are parallel to one another and form an angle α of other than 0° with the circumferential direction, such that the angle formed with the circumferential direction by the fibres of one of the composite layers is opposite to the angle formed with the circumferential direction by the fibres of the other composite layer, the said fibres of each composite layer being covered with a polymeric matrix, and the said laminate comprising an even number n of composite layers, and the sum of the angles formed with the circumferential direction by the fibres of all of the composite layers disposed radially on the same side of the median plane (P) of the laminate is equal in absolute value to the sum of the angles formed with the circumferential direction by the fibres of all of the composite layers disposed radially on the other side of the median plane (P) of the laminate, and the sum of the angles formed with the circumferential direction by the fibres of the n composite layers is 0°.

Measurement Methods

The glass transition temperature, Tg, is measured conventionally by differential scanning calorimetry (DSC), for example, and unless specifically indicated otherwise, according to standard ISO 11357-2 of 2014.

The viscosity of the resin composition of the invention in the raw state is measured at 65° C. in an Anton Paar MCR301 plate/plate rheometer on a film of resin composition with a thickness of between 1.2 and 1.4 mm, applied to a 20 mm-diameter disc and subjected to a shearing stress of 1 Pa and a stressing frequency of 1 Hz.

The properties of flexural stress at break, of flexural deformation at break and of flexural modulus are measured in accordance with standard ISO 14125:1998-06.

In a manner well known to those skilled in the art, the macrostructure (mass-average and number-average molar masses and polydispersity index—respectively abbreviated Mw, Mn and Ip) is determined by size exclusion chromatography (SEC) according to standard ISO 16014, as indicated below.

As a reminder, SEC analysis involves separating the macromolecules in solution according to their size through columns filled with a porous gel; the molecules are separated according to their hydrodynamic volume, with the bulkiest being eluted first. The sample to be analysed is simply dissolved beforehand in an appropriate solvent, tetrahydrofuran, at a concentration of 1 g/litre. The solution is then filtered through a filter with a porosity of 0.45 µm, before injection into the apparatus. The apparatus used is, for example, a Waters Alliance chromatographic line according to the following conditions:

elution solvent: tetrahydrofuran;
temperature: 35° C.;
concentration: 1 g/litre;
flow rate: 1 ml/min;
injected volume: 100 µl;
Moore calibration with polystyrene standards;
set of 3 "Waters" columns in series (Styragel HR4E, Styragel HR1 and Styragel HR 0.5);
detection by differential refractometer (for example WATERS 2410) which may be equipped with operating software (for example Waters Millenium).

A Moore calibration is carried out with a series of commercial polystyrene standards having a low Ip (less than 1.2), with known molar masses, covering the range of masses to be analysed. The recorded data (mass distribution curve of the molar masses) are used to deduce Mw and Mn, and Ip=Mw/Mn.

All the molar mass values indicated in the present application are thus relative to calibration curves produced with polystyrene standards.

In the case of a resin fraction, the average molar mass of the fraction is calculated by mass-weighted average of the molar masses of each resin. Accordingly, a fraction of a mass $m_1$ of resin 1 of molar mass $M_1$ and of a mass $m_2$ of resin 2 of molar mass $M_2$ will have an average molar mass of $(m_1M_1+m_2M_2)/(m_1+m_2)$.

The examples that follow illustrate the invention without limiting it.

EXAMPLES

Preparation of the Compositions

The procedure for the tests below is as follows: the epoxy resins are introduced, starting with the resin of greatest fluidity, into a tank equipped with a magnetic stirrer and maintained at a temperature 90° C., and stirring is continued until the mixture is homogeneous. With the temperature maintained, the curing agent is introduced next, until it has completely dissolved. The stirring and the temperature are maintained for 10 minutes after dissolution. The entire mixture is then cooled to ambient temperature. The compositions are used for measurements of $T_g$ and viscosity.

Preparation of the Test Specimens

Seven layers of grade E glass fabrics with a grammage of 300 g/m$^2$ and a linen weave (with fibres at 0° and 90°), coated with a dedicated epoxy size, are stacked in a mould. These fabrics are sold by Hexcel Composites. The layers are stacked in such a way that the fibres of each layer are parallel.

The composition prepared in the manner described above is impregnated at a temperature of 80° C. by heating the mould containing the fabrics. When impregnation has been carried out, the composite material is cured in the closed mould, at a relative pressure of 2600 Pa (0.026 bar relative), successively at 180° C. for 1.5 h then at 200° C. for 1.5 h. The mould is subsequently cooled to ambient temperature, followed by demoulding.

Standardized test specimens are cut from the composite sheets, with each test specimen having a length of 80 mm, a width of 15 mm and a thickness of 2 mm (to an accuracy of plus or minus 10%). Each composite comprises 60 weight % of fibres and 40 weight % of resin composition (to an accuracy of plus or minus 1%).

The test specimens are used for measuring the properties of flexural stress at break, flexural deformation at break and flexural modulus. The flexural modulus is determined for a flexural deformation of 0.05%, as defined in standard ISO 14125:1998-06.

Example 1—Comparison of C-1, C-2 and T-1

In this example, a resin composition conformant to the invention is compared with a phenol novolac resin composition having a similar average epoxide functionality and molar mass.

The resin compositions C-1 and C-2, conformant to the invention, based on a blend of a phenol novolac epoxy resin and cresol novolac epoxy resin, are compared with a composition in which the only resin is a commercial phenol novolac resin T-1, sold by Huntsman, having a similar average epoxide functionality and molar mass.

The compositions and test specimens are prepared as indicated above. The viscosities are measured immediately after preparation of the compositions and cooling to 65° C., and after 5 days of storage at ambient temperature and reheating to 65° C. for the purposes of measurement.

The compositions and results of measurements are indicated in Table 1.

TABLE 1

Comparison of compositions based on a phenol resin and on a resin blend

|  | T-1 Not compliant | C-1 Compliant | C-2 Compliant |
|---|---|---|---|
|  | Molar composition | | |
| Phenol novolac epoxy resin (1) | 100% |  |  |
| Phenol novolac epoxy resin (2) |  | 66.7% | 66.7% |
| Cresol novolac epoxy resin (3) |  | 33.3% | 33.3% |
| Curing agent (4), in molar equivalents of epoxide per amine function | 2 | 2 | 2 |
| Thermoplastic filler (5) |  |  | 0.5 phr |
| Molar mass (g/mol) | 642 | 650 | 650 |
| Average epoxide functionality (eq epoxide/mol) | 3.6 | 3.3 | 3.3 |
| Viscosity at 65° C. (Pa · s) at $t_0$ | 11.8 | 2.9 | 3.5 |
| Viscosity at 65° C. (Pa · s) at 5 d | — | 6.1 | 8.5 |
| Elongation at break (%) | 3.16 | 2.93 | 3.07 |
| Flexural modulus at 0.05% (MPa) | 18 412 | 17 676 | 17 869 |
| $T_g$ (° C.) | 189 | 172 | 164 |

(1) EPN 1138 - supplied by Huntsman
(2) Epikote 893 - Epoxy novolac, CAS No. 9003-36-5 - supplied by Momentive
(3) ECN 1273 - Epoxy novolac, Araldite, CAS No. 29690-82-2 - supplied by Huntsman
(4) MDEA - 4,4'-methylenebis(2,6-diethylaniline) - supplied by Lonza
(5) Thermoplastic PA12 microbeads sold by Arkema Impregnating the layers of fabric with the composition T-1 based on phenol novolac epoxy resin proves very difficult, owing to a high viscosity at to, which means that impregnation is slow (or at a higher temperature, which would increase the crosslinking rate) and necessitate careful examination to verify the homogeneity of distribution of the resin composition. Impregnation proves impossible after 24 h, because the viscosity has increased too much. Accordingly, although having a similar molar mass and a similar average epoxide functionality, the composition based on a phenol novolac epoxy resin alone does not produce the required properties both in the raw state and after crosslinking.

The conformant compositions C-1 and C-2 easily impregnate the fabric of the test specimens, even after 5 days, while being sufficiently viscous for proper covering of the fibres.

The test specimens exhibit characteristics of elongation at break, flexural modulus and glass transition temperature that are in accordance with expectations.

Comparing C-1 and C-2, it is noted that the addition of a thermoplastic filler allows a slight increase in the elongation at break and the viscosity of the raw composition, in other words the composition before polymerization, but at the expense of the glass transition temperature, which, however, remains satisfactory.

Table 2 compares a conformant composition C-1 made up on the basis of a blend of two resins, these resins being used in isolation to form the compositions T-1 and T-2. It is apparent that the viscosity of a composition based on a blend of resins cannot be deduced from the viscosities of the compositions based on the isolated resins, which makes it difficult to formulate a composition on the basis of the properties of the resins taken in isolation.

TABLE 2

|  | C-1 Conformant | T-2 Not conformant | T-3 Not conformant |
|---|---|---|---|
| Phenol novolac epoxy resin (2) | 66.7% | 100% | |
| Cresol novolac epoxy resin (3) | 33.3% | | 100% |
| Curing agent (4), in molar equivalents of epoxide per amine function | 2 | 2 | 2 |
| Molar mass (g/mol) | 650 | 435 | 1080 |
| Average epoxide functionality (eq epoxide/mol) | 3.3 | 2.5 | 4.8 |
| Viscosity at 65° C. (Pa · s) at $t_0$ | 2.9 | 0.5 | 170.8 |

(2) Epikote 893 - Epoxy novolac, CAS No. 9003-36-5 - supplied by Momentive
(3) ECN 1273 - Epoxy novolac, Araldite, CAS No. 29690-82-2 - supplied by Huntsman
(4) MDEA - 4,4'-methylenebis(2,6-diethylaniline) - supplied by Lonza Example 2—Comparison of T-4 and T-5

This example shows that the properties of a mixture of resins cannot be deduced from the properties of the constituents of the mixture taken separately. It also shows that a composition based on a blend of resins has different properties from a composition based on a cresol resin of similar molar mass and similar average epoxide functionalities.

As indicated above, a resin formulation is prepared which has a similar epoxide functionality and molar mass to a commercial cresol novolac epoxy resin T-4.

This formulation is based on a blend of a phenol novolac epoxy resin and a cresol novolac epoxy resin. The compositions are indicated in Table 3.

TABLE 3

Comparison of compositions based on a cresol resin and on a resin blend

|  | T-4 Not conformant | T-5 Not conformant |
|---|---|---|
|  | Molar composition | |
| Cresol novolac epoxy resin (1) | 100% | |
| Cresol novolac epoxy resin (2) | | 16.7% |
| Phenol novolac epoxy resin (3) | | 83.3% |
| Curing agent (4), in molar equivalents of epoxide per amine function | 2 | 2 |
| Molar mass (g/mol) | 540 | 543 |
| Average epoxide functionality | 2.7 | 2.9 |
| Viscosity at 65° C. (Pa · s) at $t_0$ | 2.4 | 1.1 |
| Viscosity 65° C. (Pa · s) at 5 d | 2.5 | 2.4 |
| Elongation at break (%) | 2.87 | 2.98 |
| Flexural modulus at 0.05% (MPa) | 19 133 | 19 528 |
| $T_g$ (° C.) | 151 | 156 |

(1) ECN 9511 - supplied by Huntsman
(2) ECN 1273 - Epoxy novolac, Araldite, CAS No. 29690-82-2 - supplied by Ciba
(3) Epikote 893 - Epoxy novolac, CAS No. 9003-36-5 - supplied by Momentive
(4) MDEA - 4,4'-methylenebis(2,6-diethylaniline) - supplied by Lonza Although these two formulations have similar molar masses and similar average epoxide functionalities, significant differences are observed between their viscosities at to and also in the profile of this viscosity over time. This example shows that the behaviour of a blend of phenol and cresol novolac epoxy resins is different from that of a single cresol novolac epoxy resin.

Although composition T-5 is a blend of phenol and cresol novolac epoxy resins, it has a molar mass and average epoxide functionality which are too low. The molar ratio of phenol novolac epoxy resin to cresol novolac epoxy resin is 5. It is merely observed that the glass transition temperature measured on the composite is below the target values for effective use of the resin compositions of the invention.

The invention claimed is:

1. A resin composition of epoxide-functionalized resins comprising at least:
   a first epoxide-functionalized novolac resin based on:
      at least one first aromatic polyphenol comprising at least one aromatic nucleus bearing at least two hydroxyl functions in the meta position relative to one another, the two positions ortho to at least one of the hydroxyl functions being unsubstituted, and
      a first compound comprising at least one aldehyde function;
   a second epoxide-functionalized novolac resin based on:
      at least one second aromatic polyphenol comprising at least one aromatic nucleus bearing at least one alkyl radical and at least two hydroxyl functions in the meta position relative to one another, the two positions ortho to at least one of the hydroxyl functions being unsubstituted, and
      a second compound comprising at least one aldehyde function; and
   a curing agent selected from the group consisting of phenolic curing agents and amine curing agents,
   wherein, for all the epoxidized novolac resins in the resin composition, an average molar mass is between 550 and 650 g/mol and an average epoxide functionality is between 3 and 3.5 eq epoxide/mol, and
   wherein the resin composition has a glass transition temperature Tg of at least 160° C.

2. The resin composition according to claim 1, wherein the at least one first aromatic polyphenol comprises at least one aromatic nucleus bearing three hydroxyl functions in the meta position relative to one another.

3. The resin composition according to claim 1, wherein the at least one first aromatic polyphenol comprises an aromatic nucleus bearing only hydroxyl groups.

4. The resin composition according to claim 3, wherein the at least one first aromatic polyphenol is selected from the group consisting of 1,3-benzenediol and 1,3,5-benzenetriol.

5. The resin composition according to claim 1, wherein the at least one second aromatic polyphenol comprises an aromatic nucleus bearing an alkyl radical comprising from 1 to 5 carbon atoms.

6. The resin composition according to claim 1, wherein the first and second compounds comprising at least one aldehyde function can be the same or different and independently comprise an aromatic nucleus bearing at least one aldehyde function.

7. The resin composition according to claim 6, wherein the aromatic nucleus of the first and second compounds comprising at least one aldehyde function also bears a carbonylalkyl radical, a hydroxyalkyl radical or both a carbonylalkyl radical and a hydroxyalkyl radical.

8. The resin composition according to claim 1, wherein a molar ratio of the second epoxide-functionalized novolac resin to the first epoxide-functionalized novolac resin is between 1:4 and 1:1.

9. The resin composition according to claim 1, further comprising between 0.1 and 1.5 phr, parts by weight per hundred parts of epoxidized novolac resins, of a reinforcing, elastomeric or thermoplastic filler.

10. The resin composition according to claim 1, wherein the curing agent is an amine curing agent comprising at least two primary amine functions located on at least one six-membered aromatic ring, the at least one six-membered aromatic ring comprising:
at least one primary amine function, and
at least two radicals Ri, which are identical or different and selected from the group consisting of linear or branched C1-C6 alkyl radicals, halogens, and ethers, ketones and esters substituted by linear or branched C1-C6 alkyl radicals,
wherein the at least one six-membered aromatic ring does not comprise a hydrogen atom located in the ortho position relative to the primary amine functions, and
wherein the amine curing agent comprises at least one second primary amine function located on the at least one six-membered aromatic ring or on an optional second six-membered aromatic ring of the amine curing agent.

11. The resin composition according to claim 1, wherein an amount of curing agent is adjusted so that there are two molar equivalents of epoxide per amine function.

12. The resin composition according to claim 1, wherein the curing agent is a phenolic curing agent comprising at least two hydroxyl functions located on at least one aromatic ring having six carbon atoms, at least one position ortho to each of the hydroxyl functions being unsubstituted.

13. A composite comprising the resin composition according to claim 1 and at least one fiber.

14. A semi-finished article comprising the composite according to claim 13 covered with a rubber composition matrix.

15. A tire comprising the semi-finished article according to claim 14.

16. A tire comprising the composite according to 13.

17. A tire comprising the composition according to claim 1.

* * * * *